United States Patent
Haas et al.

(10) Patent No.: US 9,535,626 B1
(45) Date of Patent: Jan. 3, 2017

(54) METHODS AND COMPUTER PROGRAM PRODUCTS OF SELECTING A NEW REDUNDANCY SCHEME FOR DATA RELOCATION

(71) Applicant: INTERNATIONAL BUSINESS MACHINES CORPORATION, Armonk, NY (US)

(72) Inventors: Robert Haas, Adliswil (CH); Ilias Iliadis, Rueschlikon (CH); Vinodh Venkatesan, Horgen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/964,808

(22) Filed: Dec. 10, 2015

(51) Int. Cl.
*G06F 3/06* (2006.01)

(52) U.S. Cl.
CPC .............. *G06F 3/065* (2013.01); *G06F 3/0619* (2013.01); *G06F 3/0686* (2013.01); *G06F 3/0688* (2013.01); *G06F 3/0689* (2013.01)

(58) Field of Classification Search
CPC ...... G06F 3/065; G06F 3/0619; G06F 3/0686; G06F 3/0688; G06F 3/0689
See application file for complete search history.

(56) References Cited

U.S. PATENT DOCUMENTS

| | | | |
|---|---|---|---|
| 8,639,899 B2 | 1/2014 | Kawakami et al. | |
| 8,806,296 B1 * | 8/2014 | Lazier | G06F 3/0604 711/112 |
| 9,098,433 B1 | 8/2015 | Lazier et al. | |
| 2011/0246821 A1 | 10/2011 | Eleftheriou et al. | |
| 2013/0080703 A1 * | 3/2013 | Kumagai | G06F 9/5072 711/117 |
| 2015/0023672 A1 | 1/2015 | Dai | |

(Continued)

OTHER PUBLICATIONS

Iliadis et al., "Expected Annual Fraction of Data Loss as a Metric for Data Storage Reliability," in Proc. IEEE International Symposium on Modelling, Analysis and Simulation of Computer and Telecommunication Systems, MASCOTS'14, 2014, pp. 375-384.

(Continued)

*Primary Examiner* — Eric S Cardwell
(74) *Attorney, Agent, or Firm* — Cantor Colburn LLP; David Quinn

(57) ABSTRACT

Embodiments include methods, computer systems and computer program products for selecting a new redundancy scheme for data relocation in computer system having multiple data storage tiers and multiple redundancy schemes. Aspects include: receiving, at a processor of computer system, a request to relocate a data object to a destination data storage tier, retrieving a first and a second data reliability thresholds, redundancy scheme and data access pattern information of the data object, generating a set of available redundancy schemes for the data object with at least one copy on the destination data storage tier, calculating total cost for each of available redundancy schemes using performance cost, re-encoding cost, and storage cost for each of available redundancy schemes generated, selecting a redundancy scheme, and relocating data object to selected destination data storage tier by re-encoding the data object using the selected redundancy scheme.

20 Claims, 2 Drawing Sheets

(56) References Cited

U.S. PATENT DOCUMENTS

2016/0070492 A1    3/2016  Cherubini et al.
2016/0085469 A1    3/2016  Cherubini et al.

OTHER PUBLICATIONS

V. Venkatesan et al., "Effect of Codeword Placement on the Reliability of Erasure Coded Data Storage Systems," in 10th Int'l Conference on Quantitative Evaluation of Systems, QEST, 2013, pp. 241-257.

* cited by examiner

METHODS AND COMPUTER PROGRAM PRODUCTS OF SELECTING A NEW REDUNDANCY SCHEME FOR DATA RELOCATION

BACKGROUND

The present disclosure relates generally to a data storage system, and more particularly to methods and computer program products of selecting a new redundancy scheme for data relocation.

Multi-tiered data storage systems are increasingly being used for reducing storage costs. Each data storage tier includes a different type of storage device, e.g., hard disk drive (HDD), solid state drive (SSD), magnetic tapes, optical discs, and cloud. The different storage devices are not only different in terms of their costs, accessibility, speed, and performance characteristics, but are also different in terms of their reliability characteristics. Therefore, a different redundancy scheme may be required when data is moved from one data storage tier to another to ensure the same level of protection for the data against device failures.

Depending on the applications, data may be frequently moved from one data storage tier to another for reasons of performance, accessibility, security, and reliability. For example, the data stored in an SSD can be accessed much quicker than the data stored in an HDD. Therefore, the data in the HDD may be moved to the SSD to increase the access speed. If the data had a certain redundancy scheme when stored on HDDs, e.g., 3-way replication, it has a certain level of protection assessed by an appropriate reliability measure such as the mean time to data loss (MTTDL) or the expected annual fraction of data loss (EAFDL). When it is required that there be at least one copy of the data on SSD, e.g., for performance reasons, then there are several options available, e.g., move all 3 copies of the data from the HDDs to the SSDs, or move 1 copy to SSD but keep the remaining 2 copies on HDDs. It could even be that the data is stored using a Reed-Solomon (RS) erasure code on SSD with one copy on HDD.

Each of these options results in a different level of protection for the data, a different level of storage efficiency, and a different level of performance. Therefore, it is desirable to have a storage system that can automatically change the redundancy scheme when data is moved from one data storage tier to another by considering various factors including data reliability, storage efficiency, performance, and effort required to re-encode data.

Therefore, heretofore unaddressed needs still exist in the art to address the aforementioned deficiencies and inadequacies.

SUMMARY

In one aspect, the present disclosure relates to a method of selecting a new redundancy scheme for data relocation in a computer system having multiple data storage tiers and multiple redundancy schemes. In certain embodiments, the method may include: receiving, at a processor of the computer system, a request to have at least one copy of a data object in a destination storage tier, retrieving a first and a second data reliability thresholds, the current redundancy scheme and data access pattern information of the data object, generating a set of available redundancy schemes for the data object, calculating the total cost for each of the available redundancy schemes using the performance cost, the re-encoding cost, and the storage cost for each of the available redundancy schemes generated, selecting a redundancy scheme based on the total cost and data reliability, and relocating the data object to the desired destination data storage tier by re-encoding the data object with the selected redundancy scheme.

In another aspect, the present disclosure relates to a computer system for a new redundancy scheme for data relocation in the computer system. In certain embodiments, the computer system may have multiple data storage tiers, and each of the data storage tiers has multiple redundancy schemes, and a processor in communication with the data storage tiers. In certain exemplary embodiments, the processor is configured to: receive, at the processor, a request to have at least one copy of a data object d in a destination data storage tier, retrieve a first data and a second reliability thresholds, the current redundancy scheme and the data access pattern information of the data object, generate multiple available redundancy schemes for the data object, calculate the total cost for each of the available redundancy schemes using the performance cost, the re-encoding cost, and the storage cost for each of the available redundancy schemes generated, select a redundancy scheme based on the total cost and data reliability, and relocate the data object to the desired destination data storage tier by re-encoding the data object with the selected redundancy scheme.

In yet another aspect, the present disclosure relates to a computer program product for selecting a new redundancy scheme for data relocation in a computer system having multiple data storage tiers and multiple redundancy schemes. In certain embodiments, the computer program product may include a non-transitory storage medium readable by a processor of the computer system, and storing computer executable instructions for execution by the processor of the computer system for performing a method for selecting a new redundancy scheme for data relocation. In certain embodiments, the method may include: receiving, at a processor of computer system, a request to have at least one copy of data object in a destination data storage tier, retrieving a first and a second data reliability thresholds, the current redundancy scheme and data access pattern information of the data object, generating a set of available redundancy schemes for the data object, calculating the total cost for each of the available redundancy schemes using the performance cost, the re-encoding cost, and the storage cost for each of the available redundancy schemes generated, selecting a redundancy scheme based on the total cost and data reliability, and relocating the data object to the desired destination data storage tier by re-encoding the data object with the selected redundancy scheme.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
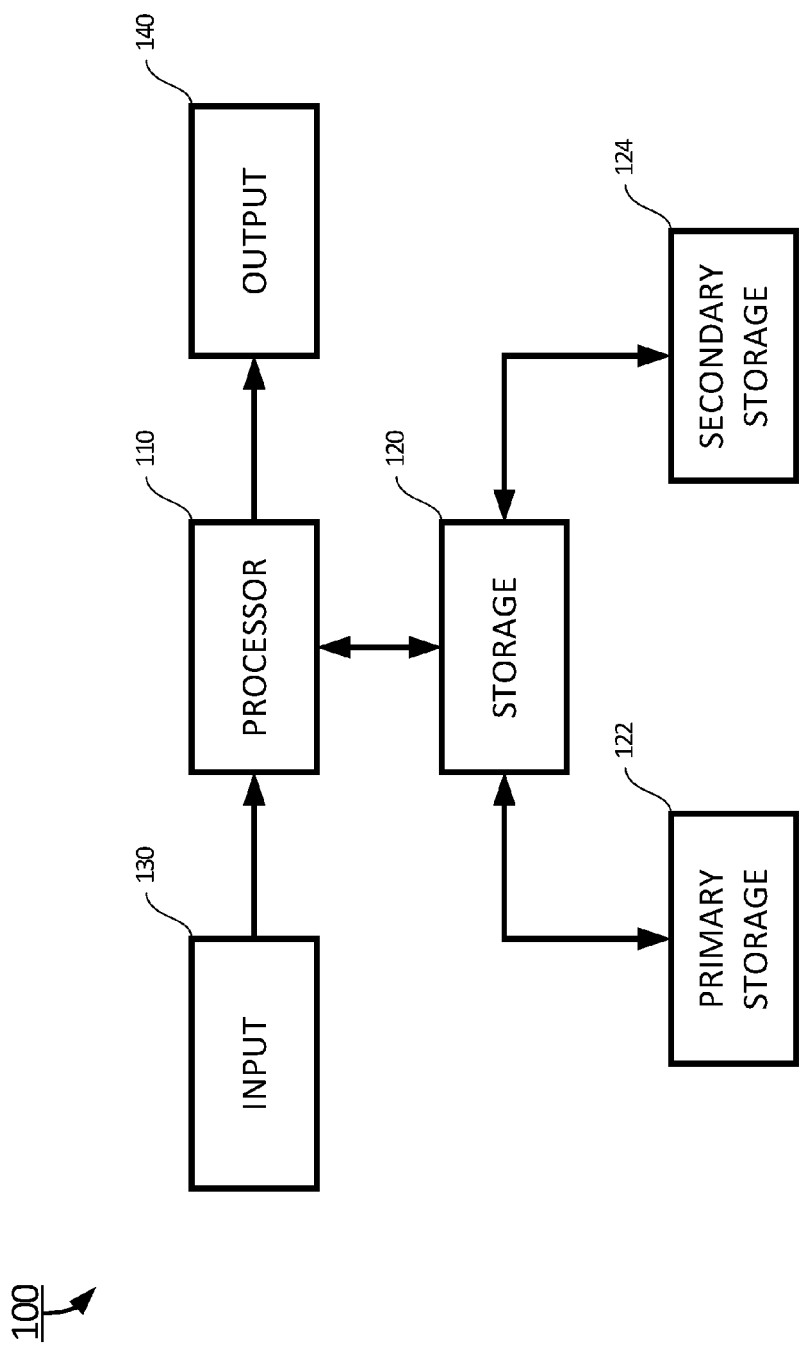
FIG. 1 is a block diagram of a computer system having various storages in accordance with certain exemplary embodiments.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The term "data object—d" is the data entity being considered for a change of data storage tier and redundancy scheme, e.g., file, object, block, etc.

The term "data storage tier" is a collection of homogeneous storage media, e.g., SSD, HDD, tape, optical disc, cloud, with the same reliability characteristics such as mean time to failure (MTTF), mean time to data loss (MTTDL), bit error rate (BER), endurance, etc.

The term "Redundancy scheme—r" is a specification of the locations of a given data object along with the replication or encoding used, e.g., 2 copies on HDD, or 1 copy on SSD and RAID-5 on HDD.

The term "Access pattern" defines the type and frequency of accesses, e.g., request arrival rate, percentage of read/write or random/sequential requests to a given data object.

The term "Data reliability—DR(r,d)" defines a quantified level of protection offered to a given data object according to the redundancy scheme used. It is expressed in terms of metrics such as MTTDL, EAFDL, BER, etc.

The term "Performance Cost—PC(r,d)" defines the cost associated with the reduction in access performance as a result of using a given redundancy scheme or storing a data object in a given data storage tier.

The term "Re-encoding Cost—REC(r,$r_c$,d)" defines the cost associated with the re-encoding and transfer of data required when changing from the current redundancy scheme, $r_c$, to a new redundancy scheme, r.

The term "Storage Cost—SC(r,d)" defines the cost associated with storing data on a given set of data storage tiers with a given redundancy scheme.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

When data is moved from one data storage tier to another for one reason or another, a redundancy scheme must be selected to ensure the relocated data has substantially the same protection. Such a selection is determined by many factors, such as, storage efficiency, data reliability, performance, effort required to re-encode data, and overall cost involved in the data relocation. Therefore, it is desirable to have a storage system that can automatically change the redundancy scheme when data is moved from one data storage tier to another by considering various factors including data reliability, storage efficiency, performance, and effort required to re-encode data.

Referring now to FIG. 1, in one aspect, a computer system 100 is shown according to certain exemplary embodiments of the present disclosure. In one embodiment, the computer system 100 may include a processor 110, a storage device 120, one or more input devices 130, and one or more output devices 140. The processor 110 may be configured to control the operation of the computer system 100. In certain embodiments, the computer system 100 may run on more than one processor as the host processor, such as two processors, four processors, eight processors, or any suitable number of processors. The storage device 120 may include a primary storage device 122, and a secondary storage 124. In certain embodiments, the primary storage device 122 can be a volatile memory, such as the random-access memory (RAM), for storing the data and information during the operation. The secondary storage device 122 can be a non-volatile data storage media for storing the data or applications of the computer system 100. Examples of the secondary storage device 122 may include flash memory, memory cards, USB drives, HDDs, floppy disks, optical drives, cloud, or any other types of data storage devices.

The different storage devices are not only different in terms of their costs and performance characteristics, but are also different in terms of their reliability characteristics. Therefore, to ensure the same level of protection for the data against device failures, a different redundancy scheme may be required when data is moved from one data storage tier to another. Determining how the data is relocated from one data storage tier to another is a complex issue, and it involves many factors, such as, storage efficiency, data reliability, performance, effort required to re-encode data, and overall cost involved in the data relocation. Therefore, it is desirable to have a storage system that can automatically change the redundancy scheme when data is moved from one data storage tier to another by considering various factors including data reliability, storage efficiency, performance, and effort required to re-encode data.

In certain exemplary embodiments, the computer system 100 may include n different data storage tiers: $X_i$, i=1, 2, . . . , and n, where n is a positive integer. Each data object d is stored with a redundancy scheme RS(d). If the data has a certain redundancy scheme when stored on HDDs, e.g., 3-way replication, it has a certain level of protection assessed by an appropriate reliability measure such as the mean time to data loss (MTTDL) or the expected annual fraction of data loss (EAFDL). In certain embodiments, when the data stored on a HDD is needed more frequently, it may be required that there be at least one copy of the data on SSD, e.g., for performance reasons. Then there are several options available, e.g., move all 3 copies of the data from the HDDs to the SSDs, or move 1 copy to SSD but keep the remaining 2 copies on HDDs. It could even be that the data is stored using a Reed-Solomon (RS) erasure code on SSD with one copy on HDD.

Each of these options results in a different level of protection for the data, a different level of storage efficiency, and a different level of performance. For example, storing 3 copies of data on SSDs will result in a storage efficiency of only ⅓ whereas storing the data using a (6, 8)-RS code would result in a storage efficiency of ¾, while offering the same order of magnitude of data reliability. However, the (6, 8)-RS code would suffer from a reduced write performance when compared to storing 3 copies because of the need to read, modify, and update the parities. It must also be noted that there may be some effort needed to change the redundancy scheme, e.g., changing the redundancy scheme from an RS code to another may potentially require re-encoding of data whereas increasing the number of replicas does not require any re-encoding. Determining how the data is relocated from one data storage tier to another is a complex issue, and it involves many factors, such as, storage efficiency, data reliability, performance, effort required to re-encode data, and overall cost involved in the data relocation. Therefore, it is desirable to have a storage system that can automatically change the redundancy scheme when data is moved from one data storage tier to another by considering various factors including data reliability, storage efficiency, performance, and effort required to re-encode data.

Figure 2:
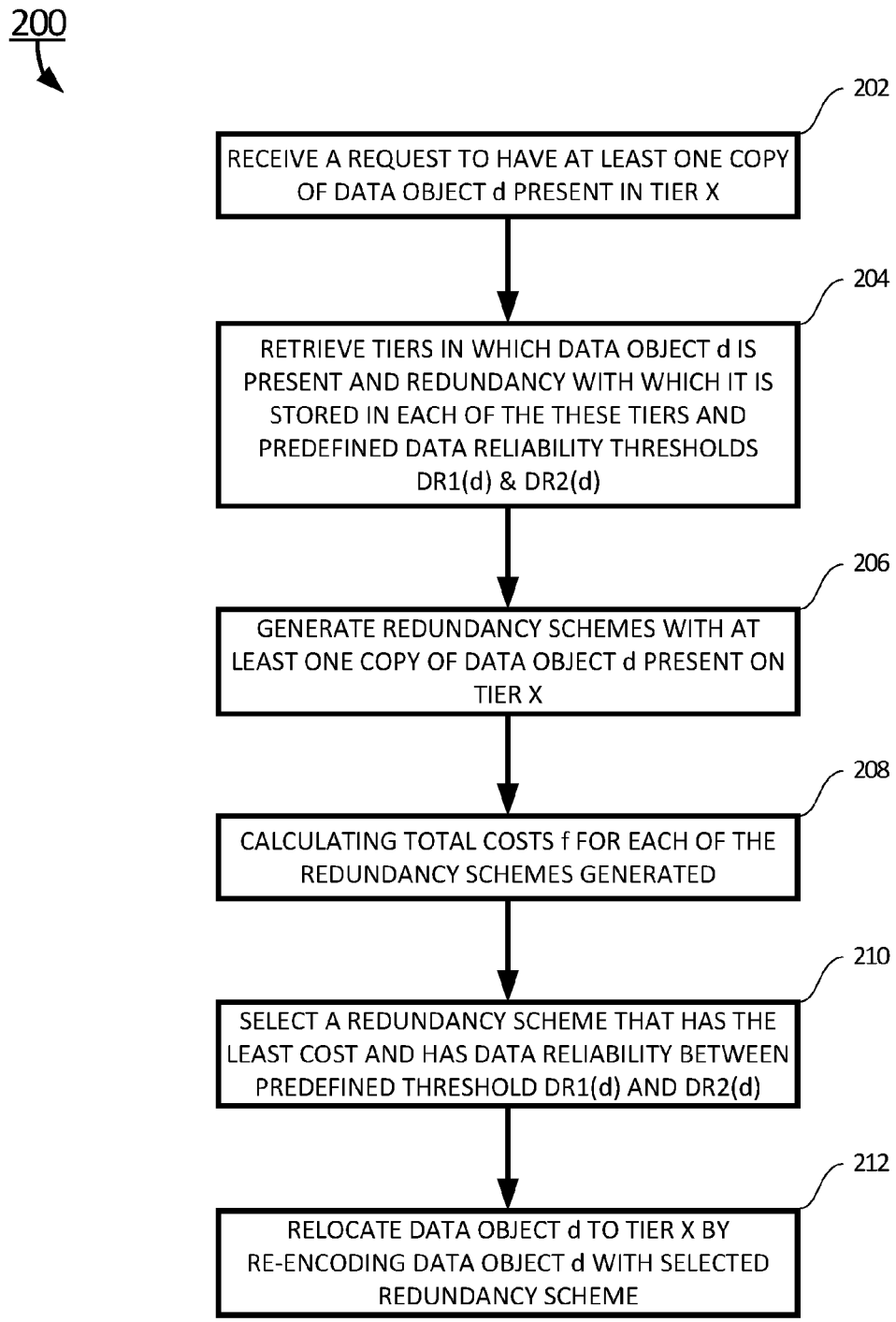
FIG. 2 is a flow chart of selecting a new redundancy scheme for data relocation in the computer system in accordance with one exemplary embodiment.

Referring now to FIG. 2, a flow chart of a computer implemented method of automatically selecting a new redundancy scheme when data is moved from one data storage tier to another in the computer system 100 is shown according to certain exemplary embodiments. As shown at block 102, the processor 110 of the computer system 100 receives a request to relocate a data object d from a source data storage tier $X_s$, to a destination data storage tier $X_d$.

Next, as shown at block 204, the method 200 may include an operation to retrieve certain information related to the current redundancy scheme $r_c(d)$. The information may include a first data reliability threshold $DR_1(d)$, a second data reliability threshold $DR_2(d)$, the redundancy scheme $r_c(d)$ of the data object d, and the data access pattern information of the data object d. The first data reliability threshold $DR_1(d)$ may be a lower data reliability threshold and the second data reliability threshold $DR_2(d)$ may be a upper data reliability threshold. The first data reliability threshold $DR_1(d)$ and the second data reliability threshold $DR_2(d)$ define the desired data reliability ranger for the data object d. The access pattern information may include type and frequency of accesses, e.g., request arrival rate, percentage of read/write or random/sequential requests to a given data object.

Continuing with reference to FIG. 1, at block 206, the method 200 may generate various available redundancy schemes r(d) with varying amounts of redundancy in each of the data storage tiers $X_i$ with at least one copy of the data in the destination data storage tier $X_d$.

As shown at block 208, the method 200 may calculate the total costs f for each of the available redundancy schemes r(d) generated. In certain exemplary embodiments, the total costs f relate to performance cost PC(r(d), d), re-encoding cost REC(r(d), $r_c(d)$,d), and storage cost SC(r(d),d) for each of the available redundancy schemes r(d), where $r_c(d)$ is the current redundancy scheme of the data object d.

In exemplary embodiments, the performance cost PC(r(d), d) is the cost associated with the reduction in access performance as a result of using a given redundancy scheme r(d) for storing a data object d. The performance cost PC(r(d), d) may be calculated by using following formula:

$$PC(r(d), d) = \sum_{i=1}^{n} \alpha(Xi)\left(p_W(d)n_p(r, Xi)\gamma_W(Xi, d) + \frac{p_R(d)\gamma_R(Xi, d)}{n_r(r, Xi)}\right)$$

wherein $\alpha(X_i)$ is a predetermined parameter associated with each data storage tier $X_i$;

$p_R(d)=\lambda_R(d)/(\lambda_R(d)+\lambda_W(d))$ is a fraction of requests to data object d for read;

$p_W(d)=\lambda_W(d)/(\lambda_R(d)+\lambda_W(d))$ is a fraction of requests to data object d for write;

$\gamma_R(Xi,d)=\lambda_R(d)*(s_R(Xi)+q_R(d)/b_R(Xi))$ is load offered to data storage tier $X_i$ by read requests;

$\gamma_W(X_i,d)=\lambda_W(d)*(s_W(X_i)+q_W(d)/b_W(X_i))$ is load offered to data storage tier $X_i$ by write requests;

$s_R(X_i)$ is the latency of read requests to data storage tier $X_i$;

$s_W(X_i)$ is the latency of write requests to data storage tier $X_i$;

$b_R(X_i)$ is the bandwidth of read requests to data storage tier $X_i$;

$b_W(X_i)$ is the bandwidth of read requests to data storage tier $X_i$;

$n_p(r,X_i)$ is the number of parities on data storage tier $X_i$ when using redundancy scheme r(d); and $n_r(r, X_i)$ is the number of replicas on data storage tier $X_i$ when using redundancy scheme r(d).

In exemplary embodiments, the re-encoding cost REC(r(d), $r_c(d)$,d) is the cost associated with the re-encoding and transfer of data required when changing from the current redundancy scheme $r_c(d)$ to a new redundancy scheme $r(d)$ with at least one copy of the data object d tier $X_d$.

In certain embodiments, the re-encoding cost REC($r(d)$, $r_c(d)$, d) may include: a re-encoding cost REC($r(d)$, $r_c(d)$, d, $X_i$) associated with changing the redundancy scheme by transfer and re-encoding of data within a data storage tier $X_i$, which is required when changing the redundancy scheme of the data object from $r_c(d)$ to $r(d)$; and a re-encoding cost REC($r(d)$, $r_c(d)$, d, $X_i$, $X_j$) associated with changing the redundancy scheme by transfer and re-encoding of data from a source data storage tier $X_i$ to a destination data storage tier $X_j$, which is required when changing the redundancy scheme of the data object from $r_c(d)$ to $r(d)$. The total re-encoding cost REC($r(d)$, $r_c(d)$, d) is then a sum of the re-encoding cost REC($r(d)$, $r_c(d)$, d, $X_i$) associated with changing the redundancy scheme by transfer and re-encoding of data within each storage tier $X_i$ and the re-encoding cost REC($r(d)$, $r_c(d)$, d, $X_i$, $X_j$) associated with changing the redundancy scheme by transfer and re-encoding of data from a source data storage tier $X_i$ to a destination data storage tier $X_j$. This total re-encoding cost REC($r(d)$, $r_c(d)$, d) is chosen as the re-encoding cost used for total cost f. For example, consider a system with two tiers, $X_1$ and $X_2$. The current redundancy scheme $r_c(d)$ of data object d consists of zero copies of the data object on tier $X_1$ and two copies of the data object on tier $X_2$. When at least one copy of the data object is required to be present on tier $X_1$, a change of redundancy scheme is needed. One possible new redundancy scheme $r(d)$ would be to place one copy of data on tier $X_1$ and employ (6, 8)-Reed Solomon code of the data on tier $X_2$. In this case, there is a re-encoding cost associated with changing the redundancy scheme by transfer and re-encoding of data within tier $X_2$, REC($r(d)$, $r_c(d)$, d, $X_2$) (i.e., the cost associated with transfer and re-encoding of data within tier $X_2$ to go from two copies on tier $X_2$ to (6, 8)-Reed Solomon code on tier $X_2$) and there is also a re-encoding cost associated with the changing the redundancy scheme by transfer and re-encoding of data from tier $X_2$ to tier $X_1$, REC($r(d)$, $r_c(d)$, d, $X_2$, $X_1$) (i.e., the cost associated with the transfer of one copy of data from tier $X_2$ to tier $X_1$). The total re-encoding cost in this example, REC($r(d)$, $r_c(d)$, d), which is used as the re-encoding cost for total cost f, is the sum of the two aforementioned re-encoding costs.

In certain embodiments, the re-encoding cost REC($r(d)$, $r_c(d)$, d, $X_i$) associated with changing the redundancy scheme by transfer and re-encoding of data within a data storage tier $X_i$ is given by Table 1.

TABLE 1

Re-encoding cost REC($r(d)$, $r_c(d)$, d, $X_i$) associated with changing the redundancy scheme by transfer and re-encoding of data within a data storage tier $X_i$.

| | Replication with $n_r(r, X_i)$ replicas ($<n_r(r_c, X_i)$) | Replication with $n_r(r, X_i)$ replicas ($>n_r(r_c, X_i)$) | Erasure code with $n_p(r, X_i)$ parities |
|---|---|---|---|
| Replication with $n_r(r_c, X_i)$ replicas | 0 | $\eta(X_i) * (n_r(r, X_i) - n_r(r_c, X_i)) * S(d)$ | $\theta(X_i) * S(d)$ |
| Erasure code with $n_p(r_c, X_i)$ parities | $\eta(X_i) * (n_r(r,X_i)-1) * S(d)$ | $\eta(X_i) * (n_r(r, X_i) -1) * S(d)$ | $\theta(X_i) * S(d)$ |

Wherein $r=r(d)$, $\eta(X_i)$ is a parameter associated with the cost of data transfer alone, $\theta(X_i)$ is a parameter associated with the cost of encoding and data transfer combined, and $S(d)$ is the size of the data object d. These parameters are predetermined and specified for each data storage tier, $X_i$.

In certain embodiments, the re-encoding cost REC($r(d)$, $r_c(d)$, d, $X_i$, $X_j$) associated with changing the redundancy scheme by transfer and re-encoding of data from a source data storage tier $X_i$ to a destination data storage tier $X_j$ is given by Table 2.

TABLE 2

Re-encoding cost REC($r(d)$, $r_c(d)$, d $X_i$, $X_j$) associated with changing the redundancy scheme by transfer and re-encoding of data from a source data storage tier $X_i$ to a destination data storage tier $X_j$.

| | Replication with $n_r(r,X_j)$ replicas | Erasure code with $n_p(r,X_j)$ parities |
|---|---|---|
| Replication with $n_r(r_c,X_i)$ replicas | $\eta(X_i, X_j) * n_r(r, X_i) * S(d)$ | $\theta(X_i, X_j) * S(d)$ |
| Erasure code with $n_p(r_c,X_i)$ parities | $\eta(X_i, X_j) * n_r(r, X_i) * S(d)$ | $\theta(X_i, X_j) * S(d)$ |

Wherein $S(d)$ is the size of the data object d, $\eta(X_i, X_j)$ is a parameter associated with the cost of data transfer from a source data storage tier $X_i$ to a destination data storage tier $X_j$ alone, and $\theta(X_i, X_j)$ is a parameter associated with the cost of encoding and data transfer combined. These parameters are specified for each pair of data storage tiers $X_i$ and $X_j$.

In certain embodiments, the storage cost SC($r(d)$,d) is the cost associated with storing data object d on a given set of data storage tiers $X_i$ with a given redundancy scheme $r(d)$, where i=1, 2, . . . , and n. The storage cost SC($r(d)$,d) is proportional to the size of the data object d, S(d), and the cost-per-GB, C($X_i$), of storing the data object d in a data storage tier $X_i$. The storage cost SC($r(d)$,d) also depends on the redundancy scheme overhead $\rho(r(d), X_i)$ in each of the data storage tiers $X_i$. The redundancy scheme overhead $\rho(r(d), X_i)$ is defined as the ratio of the total size of stored data (accounting for the redundancy) to the size of the data object $S(d)$ in storage tier $X_i$. Therefore, in one embodiment, the storage cost, SC($r(d)$,d), is estimated as follows:

$$SC(r(X_i),d) = S(d)\Sigma_{i=1}^n \rho(r(d),Xi)C(Xi).$$

Once the performance costs PC($r(d)$, d), the re-encoding costs REC($r(d)$, $r_c(d)$,d), and the storage cost SC($r(d)$,d) for each of the available redundancy schemes $r(d)$ are calculated, the total cost f is computed as a function of these estimated costs: PC($r(d)$,d), REC($r(d)$, $r_c(d)$,d), and SC($r(d)$, d). In one embodiment, the total cost f is given below:

$$f = \zeta * PC(r(d),d) + \xi * REC(r(d),r_c(d),d) + \phi * SC(r(d),d)$$

where $\zeta$, $\xi$, and $\phi$ are predetermined weighting parameters for each of the performance costs PC($r(d)$, d), the re-encoding costs REC($r(d)$, $r_c(d)$,d), and the storage cost SC($r(d)$,d), respectively.

DR($r(d)$, d) is a measure of data reliability, and it needs to be maintained between two pre-defined thresholds $DR_1(d)$ and $DR_2(d)$. When some data is relocated to a particular data storage tier for certain reasons (e.g., improved performance), DR($r(d)$, d) can change depending on how the data object d and its corresponding redundancy scheme is changed when moving a copy of the data object to another data storage tier, and there may exist multiple ways in which a copy of the data can be made available on said data storage tier. In order to maintain a certain level of data reliability of the data object d when the data object d is been relocated, the parameters of data reliability of the data object d, DR($r(d)$, d) may be used in the selection of a new redundancy scheme.

In certain exemplary embodiments, the DR(r(d), d) needs to be maintained between a pre-defined lower threshold $DR_1(d)$ and a pre-defined upper threshold $DR_2(d)$.

In one embodiment, the DR(r(d), d) may be given in terms of Mean Time To Data Loss (MTTDL). The MTTDL may include: a clustered MTTDL associated with a redundancy scheme with clustered data placement; and a declustered MTTDL associated with a redundancy scheme with declustered data placement.

In certain embodiments, the clustered MTTDL may be calculated with this formula:

$$MTTDL^{clus.} \approx \frac{\mu^{m-l}}{n\lambda^{m-l+1}} \frac{1}{\binom{m-1}{l-1}} \frac{M_1^{m-l}(G_\mu)}{M_{m-l}(G_\mu)}.$$

Where, $1/\mu$ is mean time to rebuild of a storage device, $1/\lambda$ is the mean time to rebuild of a storage device, l and m correspond to the parameters of an (l, m)-Reed Solomon code, n is the number of storage devices in the tier and the kth raw moment of the rebuild time distribution is $G_\mu$ is denoted by $M_k(G_\mu)$.

In certain embodiments, the declustered MTTDL may be calculated with this formula:

$$MTTDL^{declus.} \approx \frac{\mu^{m-l}}{n\lambda^{m-l+1}} \frac{(m-l)!}{(l+1)^{m-l}} \frac{M_1^{m-l}\left(G_{\frac{n-1}{l+1}\mu}\right)}{M_{m-l}\left(G_{\frac{n-1}{l+1}\mu}\right)} \prod_{e=1}^{m-l-1} \left(\frac{n-e}{m-e}\right)^{m-l-e}$$

In certain embodiments, the DR(r(d), d) may be obtained by using look-up tables. In other embodiments, the DR(r(d), d) may be obtained through a series of simulations.

Continuing with reference to FIG. 1, at block 210, the method 200 may select a redundancy scheme r(d). There are at least two conditions the selected redundancy scheme r(d) has to meet: the selected redundancy scheme r(d) has the least total cost among the all the generated redundancy schemes r(d), and the data reliability DR(r(d), d) of the destination data storage tier $X_d$ is between the first data reliability threshold $DR_1(d)$ and the second data reliability threshold $DR_2(d)$.

At block 212, the method 200 may relocate the data object d to the destination data storage tier X by re-encoding it with the redundancy scheme r(d).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example: the calculations of the performance cost PC(r(d), d), the re-encoding cost REC(r(d), r($X_s$),d), the storage cost SC(r(d),d) for each of the available redundancy schemes r(d), the data reliability DR(r(d), d), and the total cost f can be achieved with different formulae without departing from the novel concepts of the present disclosure.

In another aspect, the present disclosure relates to a computer system for a new redundancy scheme for data relocation in the computer system. In certain embodiments, the computer system may have multiple data storage tiers, and each of the data storage tiers has multiple redundancy schemes, and a processor in communication with the data storage tiers. In certain exemplary embodiments, the processor is configured to: receive, at the processor, a request to have at least one copy of a data object d in a destination data storage tier, retrieve a first data and a second reliability thresholds, the current redundancy scheme and the data access pattern information of the data object, generate multiple available redundancy schemes for the data object, calculate the total cost f for each of the available redundancy schemes using the performance cost, the re-encoding cost, and the storage cost for each of the available redundancy schemes generated, select a redundancy scheme, and relocate the data object to the desired destination data storage tier by re-encoding the data object using the selected redundancy scheme.

In yet another aspect, the present disclosure relates to a computer program product for selecting a new redundancy scheme for data relocation in a computer system having multiple data storage tiers and multiple redundancy schemes. In certain embodiments, the computer program product may include a non-transitory storage medium readable by a processor of the computer system, and storing computer executable instructions for execution by the processor of the computer system for performing a method for selecting a new redundancy scheme for data relocation. In certain embodiments, the method may include: receiving, at a processor of computer system, a request to have at least one copy of a data object in a destination data storage tier, retrieving a first and a second data reliability thresholds, the current redundancy scheme and data access pattern information of the data object, generating a set of available redundancy schemes for the data object, calculating the total cost f for each of the available redundancy schemes using the performance cost, the re-encoding cost, and the storage cost for each of the available redundancy schemes generated, selecting a redundancy scheme, and relocating the data object to the desired destination data storage tier by re-encoding the data object using the selected redundancy scheme.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of selecting a new redundancy scheme for data relocation, comprising:

receiving, at a processor of a computer system having a plurality of data storage tiers, a request to relocate a data object d to a destination data storage tier, wherein each of the plurality of data storage tiers comprises a plurality of redundancy schemes;

retrieving a data reliability requirement having a first data reliability threshold and a second data reliability threshold, a redundancy scheme and a data access pattern information of the data object d;

generating a plurality of available redundancy schemes for the data object d;

calculating a total cost for each of the plurality of available redundancy schemes using a performance cost associated with the reduction in access performance as a result of using a given redundancy scheme for storing the data object d, a re-encoding cost associated with the re-encoding and transfer of data required when changing from the current redundancy scheme to a new redundancy scheme with at least one copy of the data object d in the destination data storage tier, and a storage cost associated with storing data object d on a given set of data storage tiers with a given redundancy scheme, for each of the available redundancy schemes generated;

selecting a redundancy scheme from the plurality of available redundancy schemes based on the total costs calculated and the retrieved data reliability requirement; and relocating the data object d to the destination data storage tier by re-encoding the data object using the selected redundancy scheme.

2. The computer-implemented method of claim 1, wherein the plurality of data storage tiers comprises:
hard disk drive (HDD);
solid state drive (SSD);
magnetic tapes;
optical discs; and
cloud.

3. The computer-implemented method of claim 1, wherein the calculating comprises:
calculating a performance cost for each of the plurality of available redundancy schemes generated;
calculating a re-encoding cost for each of the plurality of available redundancy schemes generated;
calculating a storage cost for each of the plurality of available redundancy schemes generated; and
calculating the total cost using the performance cost, re-encoding cost, and the storage cost.

4. The computer-implemented method of claim 3, wherein calculating operation further comprises:
calculating the data reliability for each of the plurality of available redundancy schemes generated.

5. The computer-implemented method of claim 4, wherein the selected redundancy scheme associated with the destination data storage tier has the least total redundancy scheme cost among the plurality of available redundancy schemes for each of the plurality of data storage tiers, and the data reliability of the destination data storage tier is between the first data reliability threshold and the second data reliability threshold.

6. The computer-implemented method of claim 3, wherein the re-encoding cost comprises:
the re-encoding cost associated with changing the redundancy scheme within a data storage tier; and
the re-encoding cost associated with changing the redundancy scheme from a source data storage tier to each of the plurality of the data storage tiers.

7. The computer-implemented method of claim 6, wherein the re-encoding cost used for total cost calculation comprises:
the re-encoding cost associated with changing the redundancy scheme within a data storage tier when the data object remains in the source data storage tier; and
the re-encoding cost associated with changing the redundancy scheme from the source data storage tier to the destination data storage tier when the data object is relocated from the source data storage tier to the destination data storage tier.

8. A computer program product for selecting a new redundancy scheme for data relocation, the computer program product comprising:
a non-transitory storage medium readable by a processor of a computer system having a plurality of data storage tiers, and each of the plurality of data storage tiers having a plurality of redundancy schemes, and storing computer executable instructions for execution by the computer system for performing a method comprising:

receiving, at the processor of the computer system, a request to relocate a data object d from a source data storage tier to a destination data storage tier;

retrieving a data reliability requirement having a first data reliability threshold and a second data reliability threshold, a redundancy scheme and a data access pattern information of the source data storage tier;

generating a plurality of available redundancy schemes for each of the plurality of data storage tiers, according to the data access pattern information retrieved;

calculating a total cost for each of the plurality of available redundancy schemes using a performance cost associated with the reduction in access performance as a result of using a given redundancy scheme for storing the data object d, a re-encoding cost associated with the re-encoding and transfer of data required when changing from the current redundancy scheme to a new redundancy scheme with at least one copy of the data object d in the destination data storage tier, and a storage cost associated with storing data object d on a given set of data storage tiers with a given redundancy scheme, for each of the available redundancy schemes generated;

selecting a redundancy scheme from the plurality of available redundancy schemes based on the total costs calculated and the retrieved data reliability requirement; and relocating the data object d to the selected destination data storage tier by re-encoding the data object using the selected redundancy scheme.

9. The computer program product of claim 8, wherein the plurality of data storage tiers comprises:
hard disk drive (HDD);
solid state drive (SSD);
magnetic tapes;
optical discs; and
cloud.

10. The computer program product of claim 8, wherein the calculating comprises:
calculating a performance cost for each of the plurality of available redundancy schemes generated;
calculating a re-encoding cost for each of the plurality of available redundancy schemes generated;
calculating a storage cost for each of the plurality of available redundancy schemes generated; and
calculating the total cost using the performance cost, re-encoding cost, and the storage cost.

11. The computer program product of claim 10, wherein calculating operation further comprises:
calculating the data reliability for each of the plurality of available redundancy schemes generated.

12. The computer program product of claim 11, wherein the selected redundancy scheme associated with the destination data storage tier has the least total redundancy scheme cost among the plurality of available redundancy schemes for each of the plurality of data storage tiers, and the data reliability of the destination data storage tier is between the first data reliability threshold and the second data reliability threshold.

13. The computer program product of claim 10, wherein the re-encoding cost comprises:
the re-encoding cost associated with changing the redundancy scheme within the source data storage tier; and
the re-encoding cost associated with changing the redundancy scheme from the source data storage tier to each of the plurality of the data storage tiers.

14. The computer program product of claim 13, wherein the re-encoding cost used for total cost calculation comprises:
- the re-encoding cost associated with changing the redundancy scheme within a data storage tier when the data object remains in the source data storage tier; and
- the re-encoding cost associated with changing the redundancy scheme from the source data storage tier to the destination data storage tier when the data object is relocated from the source data storage tier to the destination data storage tier.

15. A computer system for selecting a new redundancy scheme for data relocation, comprising:
- a plurality of data storage tiers, each of the plurality of data storage tiers having a plurality of redundancy schemes; and
- a processor in communication with the plurality of data storage tiers, the processor configured to:
- receive, at the processor of the computer system, a request to relocate a data object d to a destination data storage tier;
- retrieving a data reliability requirement having a first data reliability threshold and a second data reliability threshold, a redundancy scheme and a data access pattern information of the data object d;
- generate a plurality of available redundancy schemes for the data object d;
- calculate a total cost for each of the plurality of available redundancy schemes using a performance cost associated with the reduction in access performance as a result of using a given redundancy scheme for storing the data object d, a re-encoding cost associated with the re-encoding and transfer of data required when changing from the current redundancy scheme to a new redundancy scheme with at least one copy of the data object d in the destination data storage tier, and a storage cost associated with storing data object d on a given set of data storage tiers with a given redundancy scheme, for each of the available redundancy schemes generated;
- select a redundancy scheme from the plurality of available redundancy schemes based on the total costs calculated and the retrieved data reliability requirement; and
- relocate the data object d to the desired destination data storage tier by re-encoding the data object using the selected redundancy scheme.

16. The computer system of claim 15, wherein the plurality of data storage tiers $X_i$ comprises:
- hard disk drive (HDD);
- solid state drive (SSD);
- magnetic tapes;
- optical discs; and
- cloud.

17. The computer system of claim 15, wherein the processor is further configured to:
- calculating a performance cost for each of the plurality of available redundancy schemes generated;
- calculating a re-encoding cost for each of the plurality of available redundancy schemes generated;
- calculating a storage cost for each of the plurality of available redundancy schemes generated; and
- calculating the total cost using the performance cost, re-encoding cost, and the storage cost.

18. The computer system of claim 17, wherein the processor is further configured to:
- calculate the data reliability for each of the plurality of available redundancy schemes generated.

19. The computer system of claim 18, wherein the selected redundancy scheme associated with the destination data storage tier has the least total redundancy scheme cost among the plurality of available redundancy schemes for each of the plurality of data storage tiers, and the data reliability of the destination data storage tier is between the first data reliability threshold and the second data reliability threshold.

20. The computer system of claim 17, wherein the re-encoding cost comprises:
- the re-encoding cost associated with changing the redundancy scheme within the source data storage tier; and
- the re-encoding cost associated with changing the redundancy scheme from the source data storage tier to each of the plurality of the data storage tiers,
- wherein the re-encoding cost used for total cost calculation comprises the re-encoding cost associated with changing the redundancy scheme within the source data storage tier when the data object remains in the source data storage tier and the re-encoding cost associated with changing the redundancy scheme from the source data storage tier to the destination data storage tier when the data object is relocated from the source data storage tier to the destination data storage tier.

* * * * *